(12) United States Patent
Shen et al.

(10) Patent No.: US 8,236,734 B1
(45) Date of Patent: Aug. 7, 2012

(54) METHOD FOR PREVENTING SCALE FORMATION IN THE PRESENCE OF DISSOLVED IRON

(75) Inventors: Dong Shen, Houston, TX (US); Randall J. Perkins, Houston, TX (US); Dwayne D. Schielke, Spring, TX (US); David H. Shcolnik, Canonsburg, PA (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 13/116,819

(22) Filed: May 26, 2011

(51) Int. Cl.
*E21B 43/28* (2006.01)

(52) U.S. Cl. .......... 507/90; 507/236; 507/237; 507/239; 507/244; 507/246; 166/268; 166/304; 166/305.1

(58) Field of Classification Search .................. 507/90, 507/236, 237, 239, 244, 246, 261, 927; 166/268, 166/304, 305.1; 203/7
See application file for complete search history.

(56) References Cited

U.S. PATENT DOCUMENTS

| | | | |
|---|---|---|---|
| 2,917,528 A | 12/1959 | Ramsey et al. | |
| 2,964,549 A | 12/1960 | Ramsey et al. | |
| 3,434,969 A | 3/1969 | Ralston | |
| 3,467,192 A | 9/1969 | Nolan et al. | |
| 3,951,827 A | 4/1976 | Burroughs et al. | |
| 4,080,375 A | 3/1978 | Quinlan | |
| 4,931,189 A | 6/1990 | Dhawan et al. | |
| 5,060,728 A | 10/1991 | Yan | |
| 5,338,477 A | 8/1994 | Chen et al. | |
| 5,655,601 A | 8/1997 | Oddo et al. | |
| 5,972,868 A | 10/1999 | Athey et al. | |
| 6,017,994 A | 1/2000 | Carter et al. | |
| 6,585,933 B1 | 7/2003 | Ehrhardt et al. | |
| 7,159,655 B2 | 1/2007 | Ke et al. | |
| 7,306,035 B2 | 12/2007 | Collins et al. | |
| 7,332,459 B2 | 2/2008 | Collins et al. | |
| 7,398,824 B1 | 7/2008 | Wang et al. | |
| 7,491,682 B2 | 2/2009 | Gupta et al. | |
| 7,493,955 B2 | 2/2009 | Gupta et al. | |
| 7,781,382 B2 | 8/2010 | Ke et al. | |
| 7,968,500 B2 | 6/2011 | Pakulski et al. | |
| 2006/0113505 A1 | 6/2006 | Przybylinski et al. | |

OTHER PUBLICATIONS

Guan, et al., "Inhibitor Selection for Iron-Scale Control in MEG Regeneration Process", SPE 114059, Society of Petroleum Engineers, Nov. 2009 SPE Production & Operations, pp. 543-549.

Hill, et al., "Iron Release Following Mineral Dissolution Following Scale Inhibitor Application in a North Alaskan Reservoir", SPE 58727, Society of Petroleum Engineers, 2000 SPE International Symposium on Formation Damage Control, Lafayette, LA, Feb. 23-24, 2000, 7 pages.

Kriel, et al., "The Effect of Soluble Iron on the Performance of Scale Inhibitors in the Inhibition of Calcium Carbonate Scales", Paper No. 44, NACE International, Corrosion 94, 8 pages.

(Continued)

*Primary Examiner* — Alicia Toscano
(74) *Attorney, Agent, or Firm* — John Wilson Jones; Jones & Smith, LLP

(57) ABSTRACT

The present invention relates to a method of using threshold scale inhibitors of the formula:

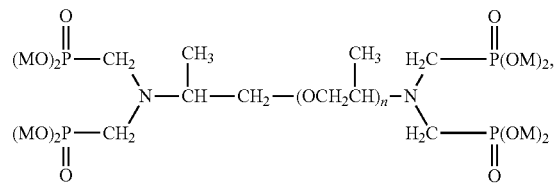

wherein n is 2 or 3 and M is hydrogen or an alkali metal cation, for preventing calcium carbonate, iron carbonate, and calcium sulfate scale formation in oilwell brines containing dissolved iron.

26 Claims, 3 Drawing Sheets

OTHER PUBLICATIONS

Webb, et al., "Economic and Technical Features of a Revolutionary Chemical Scale Inhibitor Delivery Method for Fractured and Gravel Packed Wells: Comparative Analysis of Onshore and Offshore Subsea Applications", SPE 39451, Society of Petroleum Engineers, 1998 SPE International Symposium on Formation Damage Control, Lafayette, LA, Feb. 18-19, 1998, pp. 323-336.

Steiner, "Well Treatment Composites for Use in Well Treatment Fluids", U.S. Appl. No. 13/076,304, filed Mar. 30, 2011.

Browning, et al., "Fundamental Study of the Dissolution of Calcium Phosphonates from Porous Media", AlChE Journal, vol. 42, No. 10, Oct. 1996, pp. 2883-2896.

Graham, et al., "The Impact of Dissolved Iron on the Performance of Scale Inhibitors Under Carbonate Scaling Conditions", SPE 80254, Society of Petroleum Engineers, Inc., SPE International Symposium on Oilfield Chemisty, Houston, TX, Feb. 5-7, 2003, 12 pages.

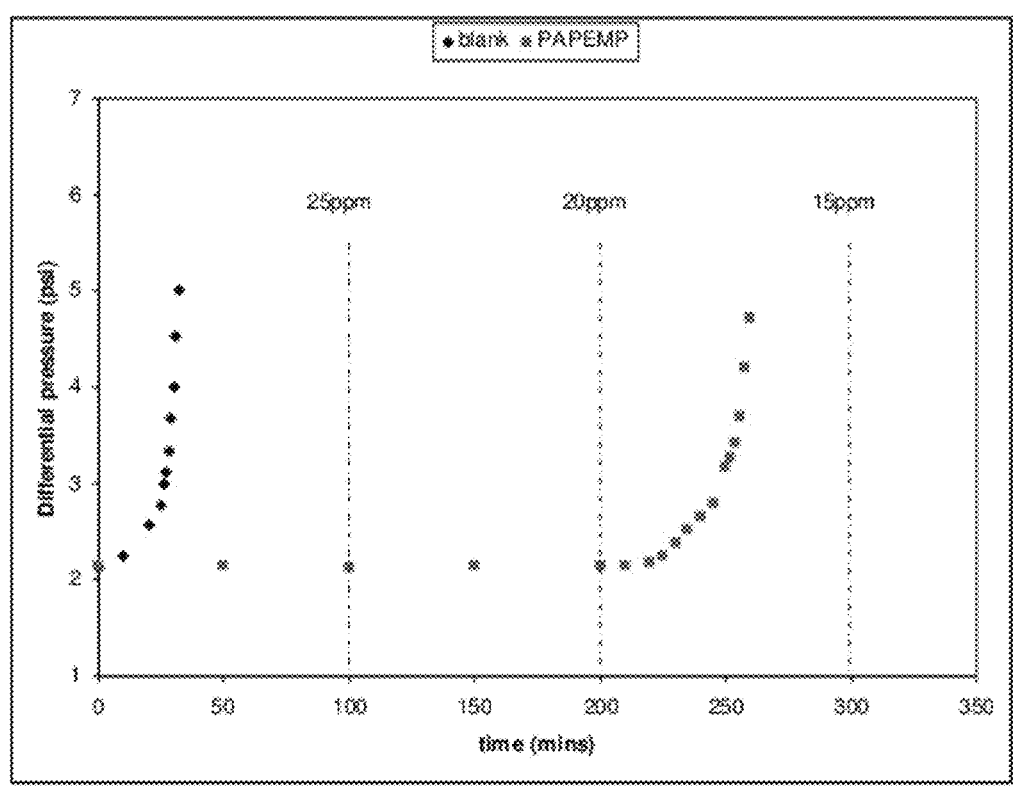
Figure 1 Performance of PAPEMP for calcium carbonate inhibition at 65°C in the presence of 200 ppm $Fe^{2+}$

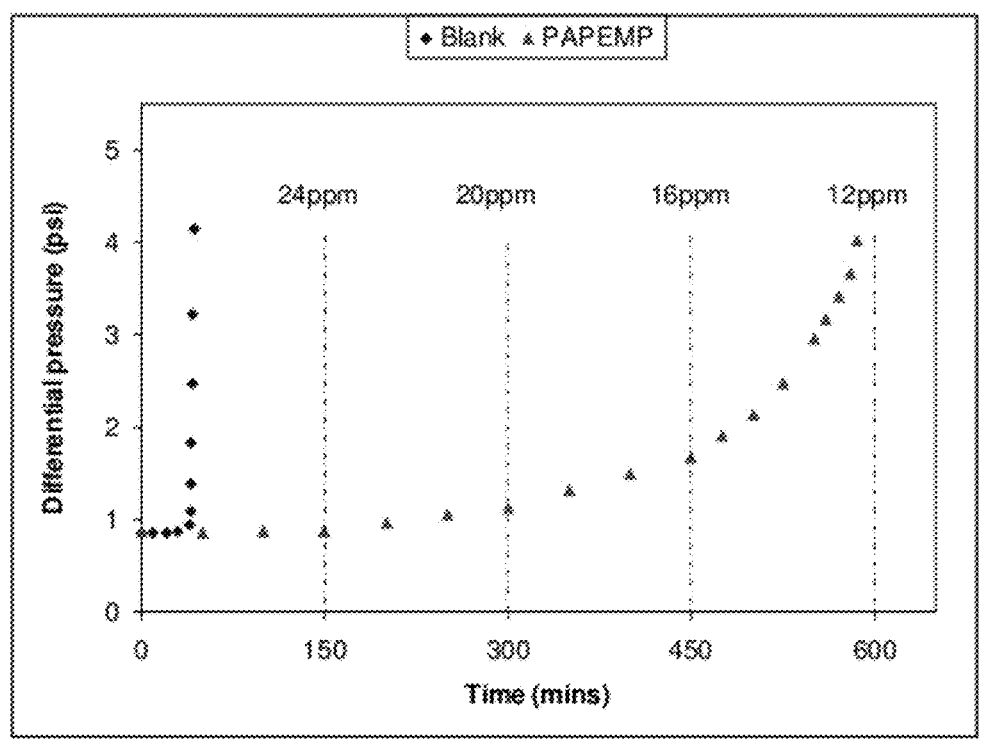
Figure 2 Performance of PAPEMP for calcium sulfate inhibition at 150°C in the presence of 100 ppm $Fe^{2+}$

Figure 3 Performance of PAPEMP combined with citric acid (PAPEMP/citric acid = 2 wt/wt) for calcium sulfate inhibition at 150°C in the presence of 100 ppm $Fe^{2+}$
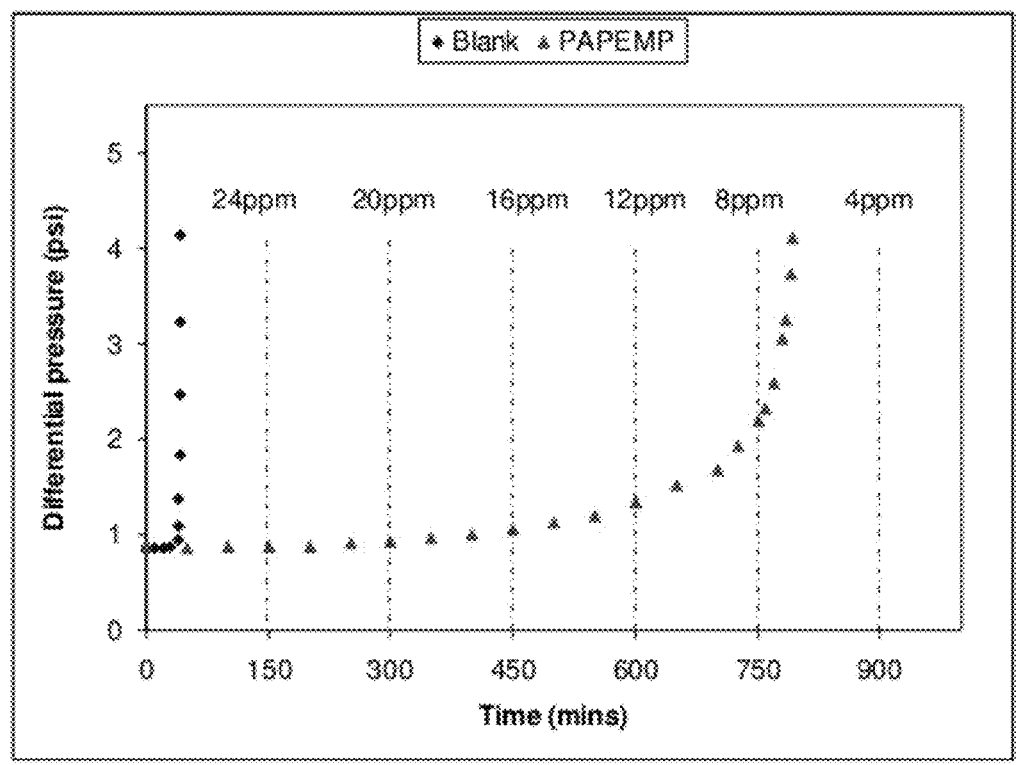

METHOD FOR PREVENTING SCALE FORMATION IN THE PRESENCE OF DISSOLVED IRON

FIELD OF THE INVENTION

The present invention relates to a method of preventing calcium carbonate ($CaCO_3$), iron carbonate ($FeCO_3$), and calcium sulfate ($CaSO_4$) scale formation in the presence of dissolved iron for oilfield brines.

BACKGROUND OF THE INVENTION

The formation of scales is a common problem in oil and gas wells. During the production of oil and gas, salt water is also produced. The produced water often contains high concentrations of alkaline earth metal cations such as calcium, strontium, and barium, along with anions such as carbonate, bicarbonate, and sulfate. Typically in areas of the oil or gas processing system where there is an abrupt physical change, such as a change in temperature or pressure, or a mixing of incompatible waters, there is a thermodynamic driving force for these inorganic salts to precipitate and form scales. These precipitations are known to form near the wellbore, inside casing, tubing, pipes, pumps and valves, and around heating coils. Reduction of near wellbore permeability, perforation tunnel diameter, production tubing diameter, and propped fracture conductivities can significantly reduce well productivity. Over time, large scale deposits can form reducing fluid flow and heat transfer as well as promoting corrosion and bacterial growth. As the deposits grow, the production rate decreases and even the whole operation could be forced to halt.

Removal of scales often requires expensive well interventions involving bullhead or coil tubing placement of scale dissolving chemical treatments, milling operations or re-perforation. Economically efficient scale management predominantly involves the application of chemical scale inhibitors that prevent scale deposition. Scale inhibitors are conventionally applied as downhole injections or squeeze treatments.

Threshold scale inhibitors are chemical agents that catalytically prevent salt precipitation, even when the brine is oversaturated. These chemicals are referred to as "threshold" scale inhibitors because they prevent nucleation and scale formation at concentrations that are far too low to be effective by stoichiometrically reacting with scale-forming ions alone, such as occurs with chelating agents. Threshold scale inhibitors are thought to achieve scale inhibition by adsorbing onto specific crystallographic planes of a growing crystal nucleus after a nucleation event. This adsorption prevents further crystal growth and agglomeration into larger aggregates.

Many aminophosphonate-based, scale inhibitors are known to the art. E.g., U.S. Pat. No. 3,434,969 (filed Aug. 11, 1967), U.S. Pat. No. 4,080,375 (filed Oct. 15, 1976), U.S. Pat. No. 4,931,189 (filed Jun. 15, 1989); U.S. Pat. No. 5,338,47 (filed May 11, 1992). However, a problem arises when the oilfield brines contain dissolved iron. Iron has been observed to have a deleterious effect on the performance of scale inhibitors. See e.g., G. M. Graham et al., *The Impact of Dissolved Iron on the Performance of Scale Inhibitors Under Carbonate Scaling Conditions*, Paper SPE 80254 presented at the International Symposium on Oilfield Chemistry, Houston, February 5-7; H. Guan et al., *Inhibitor Selection for Iron-Scale Control in MEG Regeneration Process*, November 2009 SPE Production & Operations. It has been found that many phosphonate-based scale inhibitors are particularly ineffective in the presence of iron. See Johnson, T. et al., *Phosphonate Based Scale Inhibitors for High Iron and High Salinity Environments*, Presented in Session 6 of the Royal Society of Chemistry Conference on Chemistry in the Oil Industry Manchester, UK, 31 October 2; Kriel, B. G. et al., *The Effect of Soluble Iron on the Performance of Scale inhibitors in the Inhibition of Calcium Carbonate Scales* Paper No. 44, presented at the NACE International CORROSION 94 March 1994; Coleman et al., *Iron Release Following Scale Inhibitor Application and Mineral Dissolution in a North Alaskan Reservoir-Some Field Implications*, paper presented at the SPE International Symposium on Oilfield Scale, Aberdeen, UK, 1999.

It would be a significant improvement to the industry to find a threshold scale inhibitor that can perform in oilfield waters containing dissolved iron.

SUMMARY OF THE INVENTION

The present invention is directed to a new method of use for polyamino polyether methylene phosphates (PAPEMPs) of the following structures:

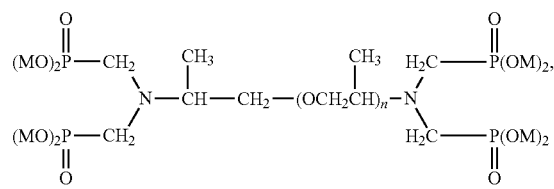

wherein n is 2 or 3 and M is hydrogen or an alkali metal cation. These PAPEMPs inhibit or control the formation of calcium carbonate, iron carbonate, and calcium sulfate scales. This method uses these PAPEMP inhibitors in brines that contain greater than 5 ppm (parts per million) of dissolved iron. Furthermore, the addition of citric acid has been shown to increase the effectiveness of these scale inhibitors. These and other features, aspects, and advantages of the present invention will become better understood with reference to the following description and claims.

BRIEF DESCRIPTION OF THE DRAWINGS

The features, aspects, and advantages of the present invention will become better understood with regard to the following description, appended claims, and accompanying drawings:

FIG. 1 shows the performance of PAPEMP for calcium carbonate scale inhibition at 65° C. in the presence of 200 ppm $Fe^{2+}$;

FIG. 2 shows the performance of PAPEMP for calcium sulfate scale inhibition at 150° C. in the presence of 100 ppm $Fe^{2+}$;

FIG. 3 shows the performance of PAPEMP combined with citric acid (PAPEMP/citric acid=2 wt/1 wt) for calcium sulfate scale inhibition at 150° C. in the presence of 100 ppm $Fe^{2+}$.

DETAILED DESCRIPTION OF THE PREFERRED EMBODIMENTS

The present invention is directed to a method of use for polyamino polyether methylene phosphates of the following structures:

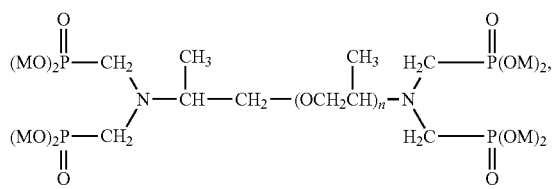

wherein n is 2 or 3 and M is hydrogen or an alkali metal cation. The method places PAPEMP into a subterranean formation, which has been penetrated by a wellbore and contains an oilfield brine with a concentration of greater than 5 ppm of dissolved iron, to control the deposition of scales, selected from the group consisting of calcium carbonate, iron carbonate, calcium sulfate or a mixture thereof.

In the most preferred embodiment, the PAPEMP is placed into a subterranean formation penetrated by a wellbore, wherein the subterranean formation contains an oilfield brine with a concentration greater than 5 ppm of dissolved iron. In another aspect, the subterranean formation contains an oilfield brine with a concentration between about 15 ppm and about 3000 ppm of dissolved iron.

In accordance with principles of the present invention, the polyamino polyether methylene phosphonate is dissolved in an aqueous treatment fluid in a concentration between about 5 ppm to about 30 ppm based on the weight of the aqueous treatment fluid. In another aspect, the PAPEMP is dissolved into an aqueous treatment fluid between about 25 ppm to about 100 ppm based on the weight of the aqueous fluid. A particularly effective amount of PAPEMP required to control calcium carbonate, iron carbonate, and calcium sulfate scale formation is about 50 ppm based on the weight of the aqueous fluid. PAPEMP in a concentration between about 10 ppm to about 50 ppm based on the weight of the aqueous treatment fluid is effective at controlling calcium carbonate and iron carbonate scales. PAPEMP in a concentration between about 5 ppm to about 30 ppm based on the weight of the aqueous treatment fluid is effective at controlling calcium sulfate scales.

Several methods are known for introducing well treatment agents into production wells, any of which may be used to introduce PAPEMP. In an aspect, PAPEMP may be injected through a downhole injection point into the completion, incorporated into a solid that will dissolve over time into the completion, added during hydraulic fracturing, or used in periodic squeeze treatments to place the inhibitor in the reservoir matrix for subsequent commingling with the produced fluids.

In a preferred embodiment, a liquid treatment fluid of PAPEMP may be forced into the formation through tubing by application of hydraulic pressure from the surface to place the treatment fluid into the targeted zone. Typically, such treatments are performed at downhole injection pressures below formation fracturing pressure. The PAPEMP may be dissolved in an aqueous solution or any solvent that would effectively transport the scale inhibitor downhole. The PAPEMP solution may be added in a single injection or it may be added to the well continuously.

In a preferred embodiment, the PAPEMP may be incorporated into a solid form of well treatment agents. In an aspect, the delivery method may consist of compressed pellets formed from a composite of well treatment agents in a matrix that may be used to slowly and continuously release the PAPEMP into a targeted area in a well. The composite may be those disclosed in U.S. Pat. Nos. 7,491,682 and 7,493,955, herein incorporated by reference.

In a scale-inhibitor squeeze, the inhibitor is pumped into the subterranean formation. In an embodiment, the method comprises mixing the PAPEMP with water and injecting down the wellbore in the opposite direction from which the oil or gas is ordinarily recovered. The well treatment composition is injected into the well followed by an over-flush. The pressure of the injection would "squeeze" the scale inhibitor into the subterranean formation, allowing for slow release as production resumes. The injection of the scale inhibitor continues until a desired amount of PAPEMP with sufficient penetration into the formation has been achieved. After injection, production is resumed by reversing the flow back to its normal direction of producing oil or gas. The inhibitor is attached to the formation matrix by chemical adsorption or by temperature-activated precipitation and returns with the produced fluid at sufficiently high concentrations to prevent scale precipitation. A pump may be used to inject additional scale inhibitor into the formation brine on a continuous or intermittent basis.

Hydraulic fracturing techniques are widely used to enhance oil and gas production from low-permeability reservoirs. During hydraulic fracturing, a fluid is injected into a wellbore under high pressure causing vertical fractures to open around the wellbore and into the subterranean formation. Often a proppant, such as sand, is included in the fracturing fluid to keep the fractures open after the treatment is complete. Ideally, the hydraulic fracturing creates high-conductivity communication with a large area of the formation allowing for an increased rate of oil or gas production. In a preferred embodiment, the scale-inhibitor system may integrate the PAPEMP and the fracture treatments into one step. In this type of treatment, PAPEMP adsorbs to the matrix surrounding the fracture face during leakoff. As water passes through the inhibitor-adsorbed zone, it dissolves a sufficient amount of the PAPEMP to prevent scale deposition. The PAPEMP may be used with any type of fracturing fluid. In an aspect, the fracturing fluid may be a polymer-based system. This method has the benefit of putting the treatment agent in contact with the scaling fluids before such fluids enter the wellbore where deleterious effects are commonly encountered.

The PAPEMP may be used in combination with other well treatment agents. In an aspect, PAPEMP may be used with corrosion inhibitors, foamers, defoamers, asphaltene and paraffin inhibitors, gas hydrate inhibitors, oxygen scavengers, biocides, surfactants, and the like. The amount of treatment agents used in the present invention may vary depending upon the desired effect of the treatment agents.

In a preferred embodiment, PAPEMP may be used in an oil or gas production system that comes in contact with an aqueous fluid that contains dissolved iron. In an aspect, the aqueous fluid contains greater than about 5 ppm of dissolved iron. In another aspect, the aqueous fluid contains between about 15 ppm and about 3000 ppm of dissolved iron. In an aspect the aqueous fluid may be an oilfield brine that contains dissolved iron.

In an embodiment, the oil or gas producing system may be a water injection system or disposal system. Incompatible waters containing significant iron are often encountered in these kinds of applications and the injection of PAPEMP into production equipment, flowlines, or wells may protect these systems from scale precipitation. In another embodiment, PAPEMP may be used in surface equipment that comes in contact with the iron containing oilfield waters.

In accordance with the principles of the present invention, citric acid may be used in combination with PAPEMP to enhance the scale inhibition performance of PAPEMP. In an aspect, an effective amount of citric acid may be added to the PAPEMP treatment formula. In a preferred embodiment, a ratio of about 2:1 by weight of PAPEMP to citric acid, respectively, may be used.

EXAMPLES

The following examples describe the preferred embodiments of the present invention. Other embodiments within the scope of the claims will be apparent to those skilled in the art from the consideration of the specification or practice of the invention disclosed herein. It is intended that the specification, together with the examples, be considered exemplary only, with the scope and spirit of the invention being indicated by the claims.

Example 1

A static bottle test was conducted to show the scale inhibition properties of PAPEMP for calcium carbonate scale inhibition in the presence of dissolved iron. In this test, two incompatible waters with the tendency to form a scale were combined in a glass bottle, heated and then observed for scale precipitation.

A synthetic brine was made from an anionic water (AW) component and a cationic water (CW) component. Each of the AW and CW brines contained twice the concentration of the anionic and cationic salt, respectively, as well as the original concentration of sodium chloride. When the AW and CW brines were mixed at a 1:1 ratio, they produced a brine with the total dissolved solids (TDS) shown in Table 1.

TABLE 1

Synthetic high TDS water

| Ion | Concentration (ppm) |
|---|---|
| Sodium | 63863 |
| Calcium | 16200 |
| Magnesium | 1200 |
| Potassium | 314 |
| Barium | 0 |
| Strontium | 500 |
| Iron | 0 to 200 |
| Chloride | 130607 |
| Bicarbonate | 1050* |

*bicarbonate concentration was increased to 1200 ppm for the dynamic tube blocking test The AW and CW brines were filtered twice through a 0.45 μm membrane filter. The AW and CW brines were continuously sparged with a combination of 96% oxygen-free nitrogen ($N_2$) and 4% carbon dioxide ($CO_2$) to adjust the brine pH to around 7.1 and to remove any dissolved oxygen. After the CW brine flowed with $N_2$ and $CO_2$ for several hours, 50 ppm ascorbic acid was added to function as an oxygen-scavenger, and then the oxygen-sensitive $FeCl_2.4H_2O$ salt was added.

The scale inhibitor was a 45 wt. % active solution of polyamino polyether methylene phosphonates, CUBLEN®, a product of Zschimmer & Schwarz, Inc. containing both n=2 and n=3 PAPEMPs. The desired amount of inhibitor was added to each test cell using 2 wt. % and 0.2 wt. % dilutions. The pH of these inhibitor stock solutions was adjusted to 6.0. 10 mL of the anion solution was added to a test cell, followed by 10 mL of the cation solution. The mixing solution was caped immediately and stirred by a Teflon coated magnetic stifling bar. The inhibition time is the time lapse between the start of the mixing of the anion with cation solutions and the first noticeable turbidity occurring in the solution measured by visual inspection through a laser beam. The test was conducted at room temperature (25° C.).

Example 2

A dynamic tube blocking test (TBT) was used to evaluate the efficiency of PAPEMP to prevent the formation and deposition of mineral scales. The TBT test aids in the determination of the minimum inhibitor concentration (MIC) required to prevent the formation of scale, and allows for the evaluation of the comparative testing of different inhibitors under similar conditions. Inhibitor efficiency is measured by the ratio of the time needed to block the tube in the presence of inhibitor divided by the time needed to block the tube in the absence of inhibitor, i.e. blank time. Conditions for the blank test are adjusted to induce significant precipitation in a reasonable time frame. The main adjusting parameters are the solution's degree of saturation of scaling species and the flow rate.

Dynamic tests complement the static tests by allowing for different facets of scale inhibitor activity to be examined. The dynamic tests examine activity under much shorter residence times than static tests, and so can be used to highlight differences between nucleation and crystal growth inhibition effects. Dynamic tests also allow for the impact of scale nucleation and growth on the walls of the micro-bore tubing to be assessed under laminar flow conditions.

A dynamic tube blocking test was used to examine the performance of PAPEMP for calcium carbonate and calcium sulfate scale inhibition at 65° C. and 150° C., respectively. For calcium carbonate scale-inhibition testing, a synthetic brine was made from an anionic water component and a cationic water component. Each of the AW and CW brines contained twice the concentration of the anionic and cationic salt, respectively, as well as the original concentration of sodium chloride. When the AW and CW brine were mixed at a 1:1 ratio, they produced a brine with the desired composition of the high TDS water (Table 1), except for the bicarbonate.

The AW and CW brines were continuously sparged with a combination of 99.0% oxygen-free nitrogen and 1.0% $CO_2$ to remove oxygen and to adjust the brine pH to around 7.7. The bicarbonate concentration was increased from 1050 ppm to 1200 ppm to increase the carbonate scaling tendency for the test brine. After the CW brine flowed with $N_2$ and $CO_2$ for several hours, 50 ppm of ascorbic acid was added to function as an oxygen-scavenger, and then the oxygen-sensitive $FeCl_2.4H_2O$ salt was added.

For calcium sulfate scale-inhibition testing, a synthetic brine was prepared to match the composition of the low TDS water (Table 2). Each of the AW and CW brines contained twice the concentration of the anionic and cationic salts, respectively, as well as the original concentration of sodium chloride. The AW and CW brines were continuously sparged with a combination of 92.5% oxygen-free nitrogen and 7.5% $CO_2$ to bring the oxygen levels down to an acceptable level and to adjust brine pH to around 5.7. After the CW brine flowed with $N_2$ and $CO_2$ for several hours, 50 ppm of ascorbic acid was added to function as an oxygen-scavenger, and then the oxygen-sensitive $FeCl_2.4H_2O$ was added.

TABLE 2

Synthetic low TDS water

| Ion | Concentration (ppm) |
| --- | --- |
| Sodium | 1940 |
| Calcium | 600 |
| Magnesium | 125 |
| Potassium | 61.7 |
| Barium | 0 |
| Iron | 100 |
| Strontium | 8.08 |
| Zinc | 0 |
| Chloride | 3744 |
| Sulfate | 1170 |
| Bicarbonate | 60 |

The AW and CW brines were pumped into the oven through pre-heating coils at 2 mL/min each. The brines were then mixed in Hastelloy C capillary tubing. The mixing capillary coil had an internal diameter of 0.75 mm and a length of 10 feet. The residence time for the brine in the mixing coil was 20.35 seconds. The differential pressure was continuously measured across the mixing coil. An increase in differential pressure indicated scale formation in the coil. The desired scale-inhibitor dosage rates were achieved by varying the ratio between the inhibitor-free AW and the inhibitor-stock solution AW. The inhibitor concentration was reduced every 100 minutes for calcium carbonate scale-inhibition test and 150 minutes for calcium sulfate scale-inhibition test, until the inhibitor failed to inhibit scale formation and the differential pressure increased by 2.5 psi or more.

The dynamic tube blocking test was also performed with the addition of citric acid in a ratio of 2:1 by weight of PAPEMP to citric acid, respectively, for a brine containing 100 ppm $Fe^{2+}$.

Test Results

PAPEMP is able to control calcium carbonate scale effectively in the presence of up to 200 ppm of $Fe^{2+}$, as shown in Table 3.

TABLE 3

$CaCO_3$ Inhibition Testing in the Presence of $Fe^{2+}$

| PAPEMP (ppm) | Inhibition Time (min) | | | | |
| --- | --- | --- | --- | --- | --- |
| | 5 ppm $Fe^{2+}$ | 25 ppm $Fe^{2+}$ | 50 ppm $Fe^{2+}$ | 100 ppm $Fe^{2+}$ | 200 ppm $Fe^{2+}$ |
| 0 | 3.5 | 3.5 | 3.5 | 3.5 | 3.5 |
| 2.5 | 10 | 10 | | | |
| 5 | 16 | 14 | 9 | | |
| 10 | 26 | 18 | 12 | 8 | |
| 25 | 42 | 28 | 19 | 15 | 13 |
| 50 | 70 | 49 | 40 | 33 | 27 |
| 75 | | 68 | 58 | 54 | 43 |
| 100 | | >80 | >80 | >70 | 64 |

Table 4 shows the enhanced performance of PAPEMP with the addition of citric acid.

TABLE 4

Citric Acid on the Performance of PAPEMP in the Presence of 200 ppm $Fe^{2+}$

| PAPEMP (ppm) | Citric acid (ppm) | Inhibition Time (min) |
| --- | --- | --- |
| 0 | 0 | 3.5 |
| 10 | 5 | 10 |
| 20 | 10 | 18 |
| 30 | 15 | 43 |
| 40 | 20 | 64 |

FIG. 1 depicts the dynamic tube blocking test results showing that the minimum inhibitor concentration or the threshold concentration required to prevent calcium carbonate scale was about 20 ppm for a brine with 200 ppm of $Fe^{2+}$. FIGS. 2 and 3 show the dynamic tube blocking test results conducted with PAPEMP for calcium sulfate scale inhibition at 150° C. in the presence of 100 ppm of $Fe^{2+}$. The inhibitor MIC was about 16 ppm to 20 ppm in the absence of citric acid, and was about 8 ppm to 12 ppm in the presence of citric acid. The results indicated that a dosage range of between about 10 ppm to 50 ppm of PAPEMP was effective at preventing calcium carbonate scale and between about 5 ppm and 30 ppm of PAPEMP was effective at preventing calcium sulfate scale.

While not wanting to be bound by any particular theory, a possible explanation for the ineffectiveness of many threshold scale inhibitors in the presence of iron is their inability to prevent seed particles of iron carbonate from forming. These seed particles increase the rate of scale growth by providing nucleation sites for further scale growth. PAPEMP inhibits the formation of these iron carbonate seed crystals.

While the compositions and methods in accordance with the present invention have been described in terms of preferred embodiments, it will be apparent to those of skill in the art that variations can be applied to the compositions and/or methods and in the steps or in the sequence of steps described herein without departing from the concept, spirit and scope of the invention. Moreover, it will be apparent that certain agents that are chemically related can be substituted for the agents described herein while the same or similar results would be achieved. All such similar substitutes and modifications apparent to those skilled in the art are deemed to be within the scope and concept of the invention. It is intended that the specification be considered exemplary only, with the scope and spirit of the invention being indicated by the claims which follow.

What is claimed is:

1. A method of treating an oil or gas well comprising:
   (a) placing into a subterranean formation, which has been penetrated by a wellbore and contains an oilfield brine with a concentration of greater than 5 ppm of dissolved iron, a polyamino polyether methylene phosphonate of the formula:

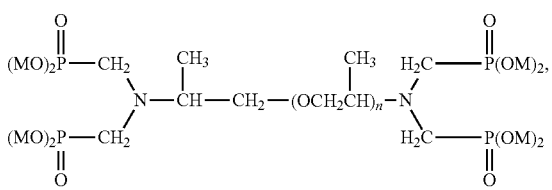

wherein n is 2 or 3 and M is a hydrogen or an alkali metal cation; and (b) inhibiting or controlling the deposition in the well and the subterranean formation of scales selected from the group consisting of calcium carbonate, iron carbonate, calcium sulfate or a mixture thereof.

2. The method of claim 1, wherein the subterranean formation contains an oilfield brine having a concentration of between about 15 ppm and about 3000 ppm of dissolved iron.

3. The method of claim 1, wherein the polyamino polyether methylene phosphonate is dissolved in an aqueous treatment fluid in a concentration between about 5 ppm to about 30 ppm based on the weight of the aqueous treatment fluid.

4. The method of claim 1, wherein the polyamino polyether methylene phosphonate is dissolved in an aqueous treatment fluid in a concentration between about 25 ppm to about 100 ppm based on the weight of the aqueous treatment fluid.

5. The method of claim 1, wherein the polyamino polyether methylene phosphonate is in a solid composite of well treatment agents.

6. The method of claim 1, wherein the scales are calcium carbonate scales.

7. The method of claim 6, wherein the polyamino polyether methylene phosphonate is dissolved in an aqueous treatment fluid in a concentration between about 10 ppm to about 50 ppm based on the weight of the aqueous treatment fluid.

8. The method of claim 1, wherein the scales are calcium sulfate scales.

9. The method of claim 8, wherein the polyamino polyether methylene phosphonate is dissolved in an aqueous treatment fluid in a concentration between about 5 ppm to about 30 ppm based on the weight of the aqueous treatment fluid.

10. The method of claim 1, wherein the scales are iron carbonate scales.

11. The method of claim 10, wherein the polyamino polyether methylene is dissolved in an aqueous treatment fluid in a concentration between about 10 ppm to about 50 ppm based on the weight of the aqueous treatment fluid.

12. The method of claim 1, wherein citric acid is placed in the subterranean formation with the polyamino polyether methylene phosphonate in a ratio of about 2:1 by weight of the polyamino polyether methylene phosphonate to citric acid, respectively.

13. A method of treating an oil or gas production system comprising:
(a) placing into the production system, which contains an aqueous fluid with a concentration greater than 5 ppm of dissolved iron, a polyamino polyether methylene phosphonate of the formula:

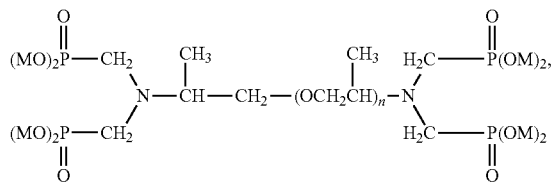

wherein n is 2 or 3 and M is a hydrogen or an alkali metal cation; and
(b) inhibiting or controlling the deposition in the production system of scales selected from the group consisting of calcium carbonate, iron carbonate, calcium sulfate or a mixture thereof.

14. The method of claim 13, wherein the production system contains an aqueous fluid having a concentration between about 15 ppm and about 3000 ppm of dissolved iron.

15. The method of claim 13, wherein the aqueous fluid is an oilfield brine.

16. The method of claim 13, wherein the polyamino polyether methylene phosphonate is dissolved in an aqueous treatment fluid in a concentration between about 5 ppm to about 30 ppm based on the weight of the aqueous treatment fluid.

17. The method of claim 13, wherein the polyamino polyether methylene phosphonate is dissolved in an aqueous treatment fluid in a concentration of about 25 to about 100 ppm based on the weight of the aqueous treatment fluid.

18. The method of claim 13, wherein the polyamino polyether methylene phosphonate is in a solid composite of production system treatment agents.

19. The method of claim 13, wherein the oil or gas production system is an injection well or a disposal well.

20. The method of claim 13, wherein the scales are calcium carbonate scales.

21. The method of claim 20, wherein the polyamino polyether methylene phosphonate is dissolved in an aqueous treatment fluid in a concentration between about 10 ppm to about 50 ppm based on the weight of the aqueous treatment fluid.

22. The method of claim 13, wherein the scales are calcium sulfate scales.

23. The method of claim 22, wherein the polyamino polyether methylene phosphonate is dissolved in an aqueous treatment fluid in a concentration between about 5 ppm to about 30 ppm based on the weight of the aqueous treatment fluid.

24. The method of claim 13, wherein the scales are iron carbonate scales.

25. The method of claim 24, wherein the polyamino polyether methylene phosphonate is dissolved in an aqueous treatment fluid in a concentration between about 10 ppm to about 50 ppm based on the weight of the aqueous treatment fluid.

26. The method of claim 13, wherein citric acid is placed in the oil or gas production system with the polyamino polyether methylene phosphonate in a ratio of about 2:1 by weight of the polyamino polyether methylene phosphonate to citric acid, respectively.

\* \* \* \* \*